United States Patent [19]

Ross et al.

[11] 4,111,186
[45] Sep. 5, 1978

[54] FLAT PLATE SOLAR COLLECTOR

[76] Inventors: Donald K. Ross, No. 9 Crosswinds, St. Louis County, Mo. 63132; Wallace A. Wright, Jr., 189 Tolley Square, Salt Lake City, Utah 84102

[21] Appl. No.: 761,808

[22] Filed: Jan. 24, 1977

[51] Int. Cl.² .............................................. F24J 3/02
[52] U.S. Cl. .................................... 126/271; 126/270; 165/168; 165/170
[58] Field of Search ............... 126/270, 271; 237/1 A; 60/641; 165/168, 170

[56] References Cited

U.S. PATENT DOCUMENTS

| 3,022,781 | 2/1962 | Andrassy | 126/271 |
| 3,200,820 | 8/1965 | Garrett | 126/271 |
| 3,985,116 | 10/1976 | Kapany | 126/271 |
| 4,026,268 | 5/1977 | Bartos et al. | 126/271 |
| 4,036,209 | 7/1977 | Press | 126/271 |

FOREIGN PATENT DOCUMENTS

| 456,406 | 3/1913 | France | 126/271 |
| 2,537,316 | 4/1976 | Fed. Rep. of Germany | 126/271 |
| 1,328,372 | 8/1978 | United Kingdom | 126/271 |

Primary Examiner—Kenneth W. Sprague
Assistant Examiner—James C. Yeung
Attorney, Agent, or Firm—Ralph W. Kalish

[57] ABSTRACT

A solar energy collector having lower and top plates in spaced-apart parallel relationship and being laterally joined to develop a chamber, fluid inlet means provided at the normally upper end of said chamber, fluid outlet means provided at the normally lower end of said chamber, said lower plate having high heat absorptivity, said upper plate having heat transmissivity for short wave energy, a multiplicity of insulators provided within said chamber developing a multiplicity of tortuous flow paths from one end of said collector to the other, and means interengaging the upper and lower plates and the intervening insulators along lines of demarcation coextensive with said collector for developing discrete flow channels.

16 Claims, 6 Drawing Figures

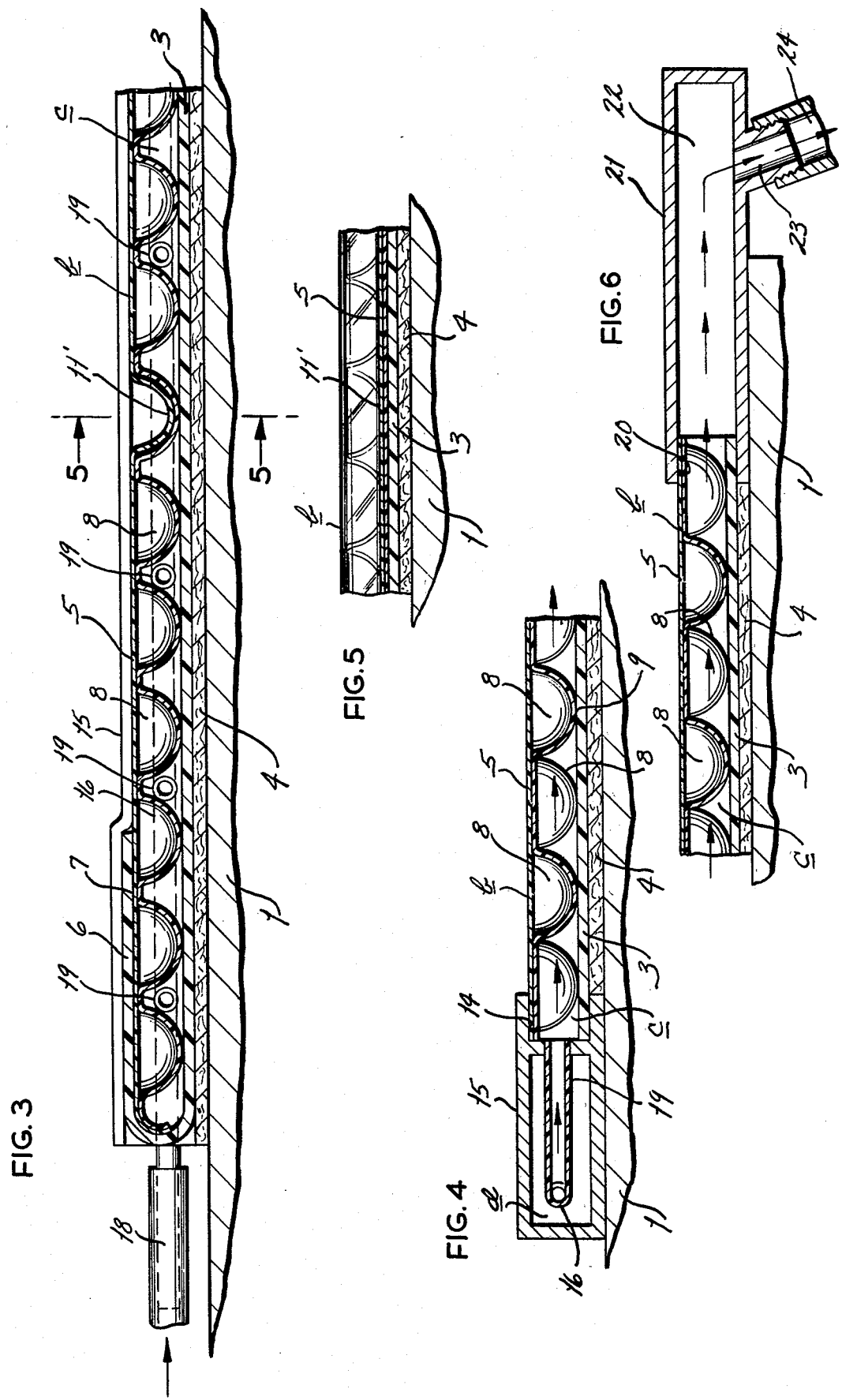

FLAT PLATE SOLAR COLLECTOR

BACKGROUND AND SUMMARY OF THE INVENTION

This invention relates in general to solar energy collection and, more particularly, to a collector of generally flat plate character for transference of solar heat to liquids.

The present invention contemplates the provision of a relatively elongated generally flat collector having a coextensive compartment subdivided into a plurality of discrete channels each internally containing a multiplicity of insulators for developing tortuous liquid flow from the normally upper end to the lower end of said collector whereby water flowing therethrough is subjected to solar heat transmitted through an upper plate for absorbing such heat with consequent temperature elevation so that the water discharged from said collector may be utilized from any of a multitude of purposes by reason of the received energy.

Therefore, it is an object of the present invention to provide a collector for solar heat which is of markedly simple construction, being comprised of a limited number of inexpensive durable components, and which may be easily used by the average individual.

It is another object of the present invention to provide a solar heat collector of the type generally stated which may be of any predetermined size for co-ordination with the area available for presentation of the collector and for the ultimate purpose of the absorbed energy.

It is a further object of the present invention to provide a solar heat collector of the type stated which incorporates a body designed for facile disposition upon a sun-exposed inclined surface permitting of gravitational liquid flow therethrough for heat absorption and, hence, temperature elevation during such flow.

It is a further object of the present invention to provide a solar heat collector of the type stated which is uniquely constructed so as to be of relatively light weight for facile handling; which may be disposed in compact form for ease of transportability, as well as storage in limited space.

It is a still further object of the present invention to provide a solar heat collector of the type stated which in operation does not require the services of an attendant; which through its unique construction is resistant to breakdown and is, hence, fully reliable in usage; which is formed of sturdy elements so as to resist damage from environmental conditions so as to be useful throughout the range of normally encountered weather conditions.

BRIEF DESCRIPTION OF THE DRAWINGS

FIG. 3 is a vertical transverse sectional view taken on the line 3—3 of FIG. 2.

FIG. 4 is a vertical transverse sectional view taken on the line 4—4 of FIG. 2.

FIG. 5 is a transverse sectional view taken on the line 5—5 of FIG. 3.

FIG. 6 is a vertical transverse sectional view taken on the line 6—6 of FIG. 1.

DESCRIPTION OF THE PREFERRED EMBODIMENT

Figure 1:
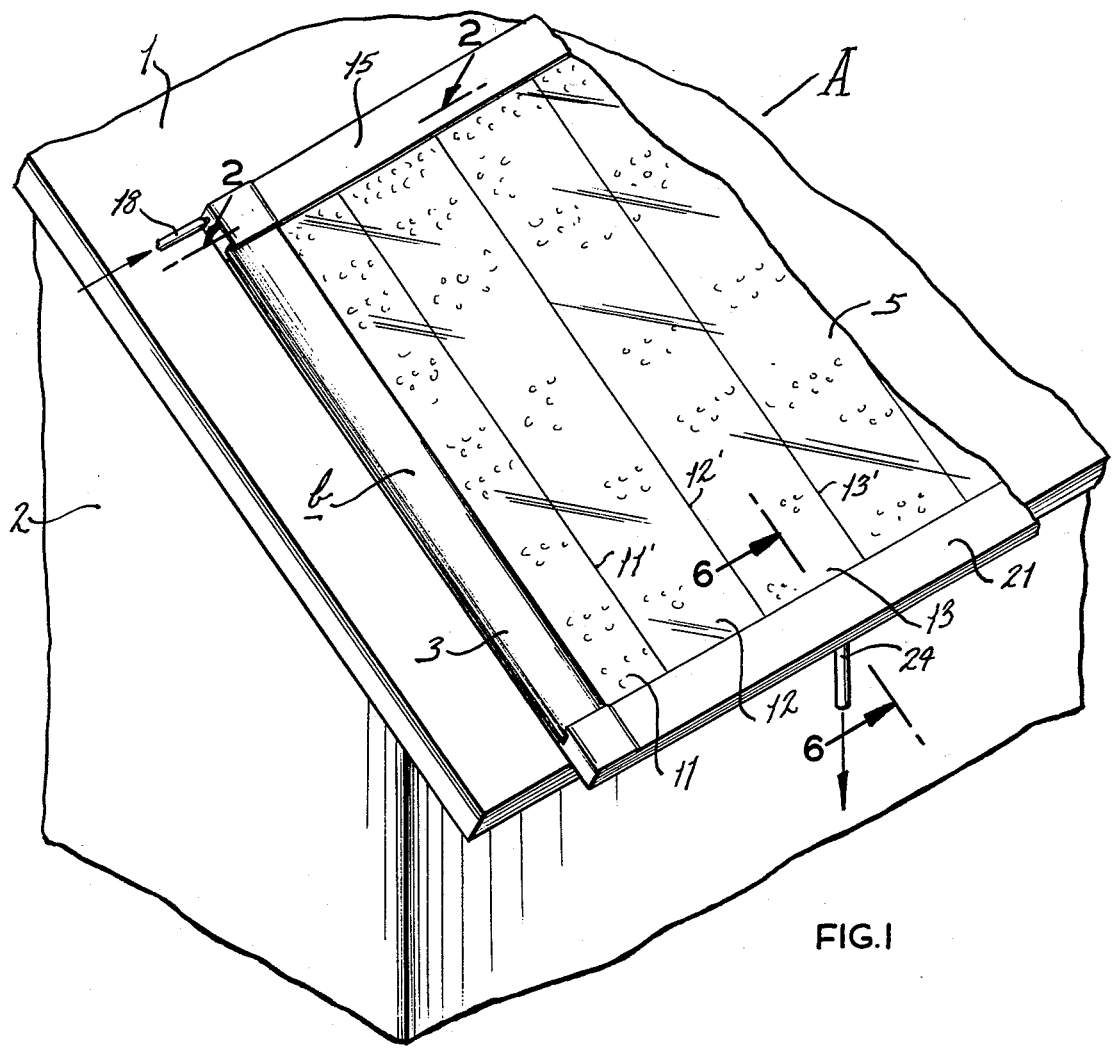
FIG. 1 is a perspective view, in partial fragment, of a flat plate solar collector constructed in accordance with and embodying the present invention illustrating said collector in operative position upon a roof.

Referring now by reference characters to the drawings which illustrate the preferred embodiment of the present invention, A generally designates a collector of solar energy which may be considered as of the flat plate type for disposition upon a suitable sun-exposed surface, such as, desirably, the roof 1 of a building 2, wherein roof 1 is inclined at a suitable angle to promote gravitational flow of heat absorbing liquid, such as water. Collector A may be considered as constituting a relatively flat container having a body $b$ for flow therealong of water received at the upper end thereof and discharged at the opposite or lower end thereof, all as will be more fully described hereinbelow.

Collector A embodies a lower or base plate 3, of sheetlike character, which is adapted to be disposed upon roof 1, or other support surface, being suitably rigidly engageable thereto as by any selected means, such as by bonding, by glutinous materials, by tacking, by tacking strips, by welding strips, or the like. If desired, said lower plate 3, in lieu of direct securement upon roof 1, may be mounted upon a sheet of flexible insulation (See FIG. 3) such as, for instance, polyurethane, and having thickness as in the order of ⅛inch. Alternatively collector A may be mounted on rigid insulation secured to the mounting surface. Insulation mounting 4 is not of extreme criticality, but has proved useful wherein the roof surface has been uneven and the like, and where heat transfer through the roof is to be minimized. Lower plate 3 is formed of synthetic material and is designed for high heat absorptivity, being of dark coloration, such as black, throughout its extent. Mounting 4 is an optional element that may prevent extremely limited heat loss to roof 1 and which may enhance stabilization of lower plate 3 in operative position.

Lower plate 3 is preferably formed of plastic material, such as polyvinyl fluoride, polyethylene, polycarbonate, and KELVAR*, being relatively thin and flexible, permitting ease of workability, but possessing the requisite properties for resisting destruction through high temperatures as in the order of 300° F. or exceedingly low temperatures, such as freezing, whereby said lower plate 3 is substantially proof against the usual range of weather conditions encountered over extended periods of time. Said lower plate 3 is inert to mildew and similar fungus-like growths so as to be of enhanced durability. Lower plate 3 may also be constructed of a material that is etched, embossed or otherwise roughened to provide a raised portion in such a way as to present greater surface area and to impede the flow thereover, thus enhancing the transfer of heat from said lower plate 3 to the liquid flowing over it, all as will be more fully discussed hereinbelow.

*KELVAR is a trademark of to identify

Spacedly above, aligned with, and in opposed relationship to, lower plate 3 is a top plate 5 which in addition to being transmissible so as to allow solar radiation to pass therethrough to the interior of collector body $b$, also serves as a protector for collector A to shield same against disruptive atmospheric conditions as developed through high winds, storms, etc., as well as having the capability of withstanding damage through high temperatures as within the order of 300° F. as well as low temperatures so that brittleness, aging, cracking and the like is obviated. Top plate 5, further has the characteristic that, while transmitting solar radiation in the inward direction, it tends to block the radiation of the longer heat waves generated by lower, absorbing, plate 3. Top plate 5 which is thus transparent and basically non-heat absorptive, is also desirably of flexible sheet character being relatively thin for maximum heat transmissivity, as of infrared radiation, yet of sufficient strength to avoid rupture through subjection to hail and like missiles, whether naturally inspired or otherwise. It has been found that material suitable for top plate 5 may be from the class consisting of polyvinyl fluoride, polyethylene polyester, fiberglas, reinforced plastics, teflon, and fluorinated ethylene propylene. Top plate 5 in addition to being highly durable and tough also is substantially impervious to ultra violet light.

Upper and lower plate 5,3, respectively, are suitably connected along their marginal portions with their main or central portions being in vertically spaced-apart, substantially planar parallel relationship, to complete the basic formation of collector body $b$ with the definition of an intervening coextensive chamber $c$ therebetween.

Admittedly there are numerous expedients whereby upper and lower plates 5,3 may be integrated or united to provide a leak proof integrity at all zones of jointure, whether seams, overlaps, or the like. For purposes of example only, lower plate 3 is shown in the drawings as having upwardly and inwardly turned lateral portions, as at 6, overlapping the underlying portion of the marginal zone of top plate 5, as at 7 (see FIG. 3) and being mutually affixed, as by adhesives, chemicals or the like. It is, of course, evident that any other type of suitable means may be used for effecting the desired mutual securement of upper and lower plates 5,3, as for example, heat welding, chemicals, solvents, tapes, etc., whereby upper and lower plates 5,3 are integrated for developing liquid proof chamber $c$. It is manifest that the maximum area of upper plate 5 will be unrestricted by optimum exposure to the sun's heat.

Provided within chamber $c$ is a multitude of insulators 8 which are of the bubble or pocket type, being popularly referred to as a bubble pack, and may have a generally hemispherical configuration, being formed for integration on the undersurface of top plate 5 with the normally open upper ends thereof directed against the undersurface of top plate 5 to develop closed pockets. Such insulators 8, being preferably of like size, are customarily vacuum-formed by well known techniques and extend between upper and lower plates 5,3 with the bottom portions thereof being secured, as by an adhesive, to the confronting upper surface of plate 3, as at 9, thereby conducing to integration of collector body $b$. The lower point of contact should encompass a reasonably small area, so that liquid flow will have the greatest possible area of surface to flow over, from which to absorb heat. Insulators 8 are dimensioned in conformity with the dimensions of the particular collector A, as if such insulators 8 are of a relatively excessive size, as related to the collector, the same will cause the creation of convection currents developing undesired heat transfer; while on the other hand, if such insulators 8 are of too limited volume, the same are insufficient for insulation purposes. The determination of the size of insulators 8 is well within the capacity of one having normal skill in the art; a range of $\frac{3}{8}$ inch to $\frac{1}{2}$ inch diameter has been found to be suitable. As will be seen in the drawings and more particularly FIG. 2, insulators 8 are arranged in a generally staggered or altenating pattern wherein discrete but tortuous channels, as indicated generally at 10 by arrows, are formed so that water flowing from the upper end of collector A to the lower end will be caused to flow around the insulators 8 and thus necessarily follow a path of a twisting nature which will have the recognized purpose of generally lengthening the time of flow of liquid from the upper end to the lower end of collector body $b$ so as to accord a relatively enhanced period for heat absorption and completely wetting the heat absorbing surface.

Figure 2:
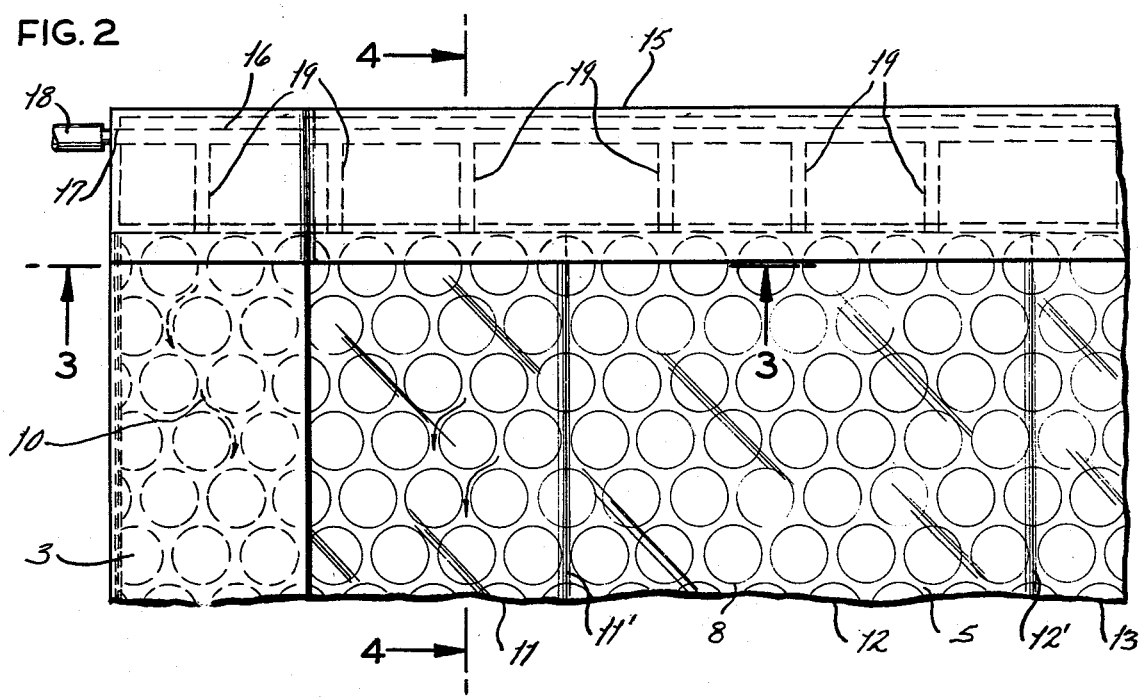
FIG. 2 is an enlarged fragmentary plan view of the upper left hand corner of the collector shown in FIG. 1 as generally within the zone defined by line 2—2.

As is best indicated in FIGS. 1 and 2, collector body $b$ is lengthwise divided into a multiplicity of channels extending the full length of collector body $b$ and which may be of varying width, as indicated at 11, 12, 13, and which channels are developed by heat sealing or otherwise securing upper and lower plates 5,3 along lines of securement, as broadly indicated at 11', 12', 13', which latter distinctly demarcate the interior of chamber $c$ into the preselected number of such discrete channels. Such channels, as exemplified by 11, 12 13, are coextensive with collector A so that as will be shown, water entering the upper end of one channel will be prevented from flowing laterally into an adjacent channel and thereby be constricted to flow within but a single channel. Channels 11, 12, 13 are shown as being of different width, but such is merely for expository purposes since the channels may be of any desired width commensurate with the overall dimension of collector A and the nature of the surface supporting same. In actual practice, a width of about 3 inches to 4 inches has been found to be most efficient. But with an underlying support surface which is not of an even character so that a transverse slope is encountered, the channels 11, 12, 13 and the like prevent, as will be shown more fully hereinbelow, the liquid to be heated from flowing to one side of collector A with expectedly imperfect and unsatisfactory heat absorption; with a substantial portion of the collector body $b$ being unused. Thus, the generalization of collector body $b$ assures of substantially even distribution of the liquid to receive the heat to be distributed through the entire collector so that maximum efficiency is assured.

At its upper end collector body $b$ is snugly received within a downwardly opening recess 14 provided at the lower end of a casing 15 extending transversely of collector A and being coextensive therewith; said casing 15 forming a substantially enclosed chamber $d$ for receiving a liquid manifold, 16, which projects through an opening, as at 17, in one side wall of casing 15 for connection to a liquid supply pipe, indicated at 18, which suitably leads from a convenient source of liquid. The opposite end of manifold 16 is closed but throughout the extent of manifold 16 within casing 15 there are provided a multiplicity of branch conduits 19 which are spaced-apart throughout the length of manifold 16 for directing flow from said manifold and into the various collector channels 11, 12, 13, as the case may be. Depending upon the width of the particular channel being serviced manifold 16 will in such zone contain a commensurate number of such branches 19. Manifold 16 may be considered of the balancing type and might merely comprise, if desired, a plastic hose having spaced-apart perforations (not shown) on lieu of branches 19 and could contain piercing elements so as to engage the hose intimately with the collector body $b$ which elements would have the function of maintaining the manifold and the collector body *b* in desired mutual securement and with assurance of the perforations opening into what might normally be the closed end of collector body *b*. Thus, there are admittedly numerous manners in which to provide a liquid manifold for introducing water or the like into the collector body channels and that illustrated is for purposes of basic clarification only.

At its lower end collector body *b* is similarly received within what might be considered the normally upper open end 20 of a lower casing 21 being coextensive with collector body *b*, but which casing 21 is provided interiorly with a continuous chamber 22 to constitute a manifold into which liquid will flow from each of the collector channel bodies 11, 12, 13, etc. (see FIG. 6). In its lower end portion, casing 21 incorporates a relatively short downwardly extending outlet 23 which may be engaged, as by threading, to a discharge pipe 24 leading to a warm water reservoir, a heat exchanger, motor, or the like. Thus, after having traversed collector body *b* water flowing from inlet manifold 16 is discharged from collector A through discharge pipe 24 for collection or immediate purposeful usage as the case may be. A pressure relief valve (not shown) may be provided in the lower end manifold so that in the event of blockage of the drain, relief from hydrostatic pressure will be provided in order to prevent bursting of collector A should a head of liquid be built up therewithin. Such valve might take the form of a spring loaded valve or a safety panel designed, to open, below the bursting strength of collector A.

From the foregoing the operation of solar collector A should be readily apparent. Water or other heat absorbing liquid is fed into the body *b* of collector A from its source via inlet manifold 16 and branch conduits 19 for flow through gravity by reason of the angulation of the roof 1 supporting collector A within the tortuous, insulator-developed paths 10 within the various channels 11, 12, 13, etc. It is, of course, understood that the liquid source will have sufficient pressure so as to overcome any adverse gravitational effect developed through any transverse angulation of roof 1 so that the liquid will be directed to all of the various channels in order that the entirety of collector A may at all times be in effective, economic use. The water flowing within collector A is subjected to solar energy transmitted through top plate 5, which energy will be substantially absorbed by the highly heat absorbably lower plate 5. Accordingly, the liquid will be continuously receiving heat from the heated lower plate as well as some limited heat passing through chamber *c* toward said lower plate 5. Insulators 8 thus serve to restrict the zones for heat conduction while the insulator and the top plate 5 tend to prevent re-radiation of the lower frequency heat generated at the lower absorbing plate 3; and thereby conduce to the most efficient utilization of solar heat transmitted through top plate 5. Accordingly, as the water travels along collector body *b* it will gradually be elevated in temperature so that when flowing into casing 21 and thence outwardly through discharge pipe 24 it will have reached a substantial temperature level when considered in terms of the temperature of the water being fed to said collector A. Although there may be some initial pressure from any pump at the water source, such is inconsequential for driving water through collector A as such pressure is merely adequate to assure of overcoming any adverse transverse roof slope as the water moving through collector A should be considered as flowing solely under gravitational effect.

It is particularly interesting to observe that collector A is uniquely constructed to prevent any loss of heat through re-radiation as top plate 5 permits transmission of infrared heat, which is of relatively short wave form, into chamber *c*, while being impervious to relatively long waves so that the short waved heat which passes into collector A will not be lost as by re-radiation if the same were of long wave character. This particular condition has been more popularly referred to as the "greenhouse effect" in that collector A while being transparent to sun radiation is opaque to heat re-radiation.

It is obvious that the present invention would operate upon roofs and other supporting members of varying degree of angularity with respect to the vertical.

The dimensions of collector A are indeed optional depending upon the support surface available and the quantity of liquid which can be efficiently threated. As shown above by reason of the nature of the materials of construction the body of collector A is generally flexible and, hence, capable of being rolled upon itself so as to be compressed into a relatively compact entity for ready transportability, storage in minimum space, and facility of handling for disposing same in, and removing same from, operative condition. While the preferred embodiment is preferably fabricated of flexible materials adapted to be rolled for tranporting, as well as for conforming to the mounting surface, it is contemplated that more rigid materials might also be used if desired.

Considerable experimentation has been effected with the present invention to establish its reliability and absolute feasibility for the intended purpose. Purely exemplary is the fact that experiments have demonstrated that with an outdoor temperature of 73° F. and a water inlet temperature of 70° F., water moving once through the collector will attain a temperature of 80° F. with an overcast sky, and a sun angle at 50° from the normal plane of collector A. To attain such results a collector having a dimension of approximately 80 feet in length, and with a top and bottom layer having an exposed width of between 3 to 3-½ feet was adequate thereby demonstrating the highly efficient nature of the present invention. In obtaining the foregoing results it was determined that the flow of water was at a rate of 225 pounds of water per hour and with such latter being multiplied by the 10° rise in temperature would evidence a production of 2250 BTU per hour. It was further discovered that with water being caused to flow at a rate more rapid than 225 pounds per hour, an increased portion of the surface of collector A was covered resulting in a relatively greater degree of heat transfer and, accordingly, a higher energy availability in the discharged water.

Therefore, from the foregoing the uniqueness of the present invention is most apparent and with the lack of costly personnel attendance being obvious. The structure is uncomplicated and with a total absence of moving parts assures of longevity of usage in a most reliable and economical fashion.

Having described our invention, what we claim and desire to obtain by Letters Patent is 1. A solar energy collector of non-rigid character for facile rolling upon itself when in disuse comprising a lower plate and a top plate in planar parallel relationship, means joining said lower and top plates in their side portions for defining an interior chamber, said top plate being fabricated of relatively thin, durable, flexible transparent sheet material being transmissible to solar heat waves and substantially non-heat absorptive, said lower plate being of flexible, relatively thin sheet material and being heat-absorptive and impervious to water, said top plate having the property of substantially inhibiting the re-radiation therethrough of relatively long heat waves generated by said lower plate, means provided at one end of said chamber for water inlet, means provided at the opposite end of said chamber for heated water discharge, flexible, water-impervious means defining a plurality of insulator compartments arranged within said chamber and extending from said top plate to said lower plate, each of said insulator compartments being closed throughout their extent and having upper and lower ends respectively immediate adjacent said top and lower plates, said insulator compartments through their arrangement defining intervening water flow paths connecting said inlet and said discharge means, each of said compartments being of decreasing cross-section progressing downwardly from said top plate to said lower plate whereby the upper portions of said compartments overlie portions of said flow paths thereby tending to insulate the water in said flow paths for minimizing development of air convection currents.

2. A solar energy collector as defined in claim 1 and further characterized by the side portions of each of said compartments being formed upon decreasing cross-sectional areas whereby the outer faces of said side portions provide surfaces permitting of gravity flow downwardly into the adjacent water flow paths of any condensation collecting upon such side portions.

3. A solar energy collector as defined in claim 1 and further characterized by each of said insulator compartments being of parti-spherical contour having thus downwardly rounded side portions permitting of gravity flow to the adjacent flow paths of any condensation collecting upon such rounded side wall portions.

4. A solar energy collector as defined in claim 1 and further characterized by the upper larger end portions of said compartments being in relative adjacency to the proximate compartments for substantially underlying the top wall throughout its extent thereby inhibiting condensation collecting upon the under surface of said top wall with undesired resistance to transmissiblity of solar radiation therethrough.

5. A solar energy collector as defined in claim 1 and further characterized by said insulator compartments being presented substantially throughout the volume constituting said chamber and with their staggered or offsetting relationship being with respect to the longitudinal axis of said collector and with the developed tortuous flow paths constituting heat conduction zones.

6. A solar energy collector as defined in claim 1 and further characterized by said insulator compartments being mutually arranged in staggered or offsetting relationship thereby cooperating to develop intervening tortuous flow paths for water flowing from said inlet means to said discharge means.

7. A solar energy collector as defined in claim 1 and further characterized by means spacedly securing said top and lower plates together with preselected aligned insulator compartments developing spaced lines of securement coextensive with said collector and axially parallel therewith for defining the limits of discrete flow channels extending lengthwise wise of said collector and including the contained portions of tortuous flow paths.

8. A solar energy collector as defined in claim 7 and further characterized by said manifold means intercommunicating said water inlet means with the adjacent ends of said flow channels, and second manifold means interconnecting the water discharge means with the proximate ends of said discrete flow channels.

9. A solar energy collector as defined in claim 1 and further characterized by operatively associated support means for said collector stably disposing same in inclined relationship to the vertical for promoting gravity flow of water from said inlet means through said tortuous flow paths to said water outlet means.

10. A solar energy collector as defined in claim 1 and further characterized by insulation means provided for disposition beneath said bottom plate.

11. A solar energy collector as defined in claim 1 and further characterized by said bottom plate being formed of plastic sheet material being black in coloration, resistant to damage at temperatures up to at least 300° F., resistant to damage through freezing temperatures, impervious to water, and resistant to destruction by wind forces and resistant to deterioration by mildew and like fungi agents.

12. A solar energy collector as defined in claim 11 and further characterized by said bottom plate being formed of plastic sheet material from the class consisting of polyvinyl fluoride and polyethylene; and said upper plate being formed from plastic sheet material from the class consisting of polyvinyl fluoride, polyethylene, polyester, fiberglas, reinforced plastics, teflon, and fluorinated ethylene propylene.

13. A solar energy collector as defined in claim 3 and further characterized by said insulators being of general hemispherical character being wider at their upper ends and secured thereto to the undersurface of the upper plate and with the lower reduced ends of said insulators being secured upon said lower plate.

14. A solar energy collector as defined in claim 1 and further characterized by said upper and lower plates together with the intervening insulators being secured along lines of securement coextensive with said collector for developing lengthwise extending discrete flow channels.

15. A solar energy collector as defined in claim 14 and further characterized by said channels being of varying width.

16. A solar energy collector of non-rigid character for facile rolling upon itself when in disuse comprising a lower plate and a top plate in planar parallel relationship, means joining said top and lower plates in their side portions for defining an interior chamber, said top plate being fabricated of relatively thin, durable, flexible transparent sheet material being transmissible to solar heat waves and substantially non-heat absorptive, said bottom plate being of relatively flexible, thin sheet material, being heat-absorptive and impervious to water, means provided at one end of said chamber for water inlet, means provided at the opposite end of said chamber for warm water discharge, flexible, water-impervious means defining a plurality of insulator compartments of bubble-like pocket form arranged within said chamber and extending between said top plate and said bottom plate, each of said compartments being closed throughout their extent and having their upper and lower ends respectively immediately adjacent said top and bottom plates, said compartments being arranged in a staggered or off-set pattern throughout the extent of said chamber for cooperating to develop intervening tortuous flow paths for water flowing from said inlet means to said outlet means.

* * * * *

UNITED STATES PATENT OFFICE
CERTIFICATE OF CORRECTION

Patent No. 4,111,186          Dated September 5, 1978

Inventor(s) Donald K. Ross and Wallace A. Wright, Jr.

It is certified that error appears in the above-identified patent and that said Letters Patent are hereby corrected as shown below:

Claim 7, line 64, delete "wise".

Signed and Sealed this

Third Day of April 1979

[SEAL]

Attest:

RUTH C. MASON
Attesting Officer

DONALD W. BANNER
Commissioner of Patents and Trademarks